US009663678B2

(12) United States Patent
Mclennan et al.

(10) Patent No.: US 9,663,678 B2
(45) Date of Patent: May 30, 2017

(54) WATERPROOFING COATING COMPOSITIONS

(75) Inventors: Alistair Mclennan, Koenigstein (DE); Linlin Miao, Shanghai (CN)

(73) Assignee: CELANESE SALES GERMANY GMBH, Sulzbach (DE)

( * ) Notice: Subject to any disclaimer, the term of this patent is extended or adjusted under 35 U.S.C. 154(b) by 7 days.

(21) Appl. No.: 14/408,183

(22) PCT Filed: Aug. 10, 2012

(86) PCT No.: PCT/CN2012/079940
§ 371 (c)(1),
(2), (4) Date: Jan. 22, 2015

(87) PCT Pub. No.: WO2014/023015
PCT Pub. Date: Feb. 13, 2014

(65) Prior Publication Data
US 2015/0184015 A1    Jul. 2, 2015

(51) Int. Cl.
*C09D 131/04* (2006.01)
*C09D 7/12* (2006.01)
*C09D 5/02* (2006.01)

(52) U.S. Cl.
CPC ........... *C09D 131/04* (2013.01); *C09D 5/027* (2013.01); *C09D 7/125* (2013.01); *C08L 2205/025* (2013.01); *C08L 2205/03* (2013.01)

(58) Field of Classification Search
CPC ......... C08L 29/04; C09D 5/027; C09D 7/125; C09D 7/1216; C09D 131/04
See application file for complete search history.

(56) References Cited

U.S. PATENT DOCUMENTS

| | | |
|---|---|---|
| 2,434,695 A | 1/1948 | Helms |
| 4,035,329 A | 7/1977 | Wiest et al. |
| 4,472,165 A | 9/1984 | Gregorian et al. |
| 4,525,492 A | 6/1985 | Rastall et al. |
| 5,070,134 A | 12/1991 | Oyamada et al. |
| 5,124,394 A | 6/1992 | Lenney |
| 5,143,954 A | 9/1992 | Hutton et al. |
| 5,364,904 A | 11/1994 | Farmer et al. |
| 5,366,550 A | 11/1994 | Schad et al. |
| 5,540,987 A | 7/1996 | Mudge et al. |
| 5,633,334 A | 5/1997 | Walker et al. |
| 5,849,389 A | 12/1998 | Lunsford |
| 6,001,916 A | 12/1999 | Walker et al. |
| 6,211,400 B1 | 4/2001 | Berghofer et al. |
| 6,245,851 B1 * | 6/2001 | Petrocelli ............ C08F 218/08 524/459 |
| 6,586,622 B2 | 7/2003 | Berghofer et al. |
| 6,696,519 B2 | 2/2004 | Brown et al. |
| 6,762,239 B1 * | 7/2004 | Williams ............. C08F 210/02 524/459 |
| 6,770,722 B2 | 8/2004 | Weitzel et al. |
| 6,787,594 B1 * | 9/2004 | Goldstein ............ C08F 218/08 524/457 |
| 2002/0032268 A1 | 3/2002 | Weitzel |
| 2008/0039572 A1* | 2/2008 | Mueller ................ C08F 218/08 524/457 |
| 2010/0056696 A1 | 3/2010 | Poole et al. |
| 2010/0243151 A1 | 9/2010 | Stokes |
| 2011/0217528 A1 | 9/2011 | Wiercinski et al. |
| 2015/0148733 A1* | 5/2015 | Wang .................... C08L 29/04 604/11 |

FOREIGN PATENT DOCUMENTS

| | | |
|---|---|---|
| CN | 1872886 A | 12/2006 |
| EP | 647658 B1 | 11/1998 |
| JP | 2005146194 A | 6/2005 |

OTHER PUBLICATIONS

Extended European Search Report issued in a corresponding EP 12882818.3 on Jan. 8, 2016.
International Search Report and Written Opinion issued in a corresponding PCT/CN2012/079940 on May 16, 2013.

* cited by examiner

*Primary Examiner* — Ling Choi
*Assistant Examiner* — Chun-Cheng Wang
(74) *Attorney, Agent, or Firm* — Roberts Mlotkowski Safran Cole & Calderon P.C.

(57) ABSTRACT

A coating composition comprises an emulsion copolymer of a monomer mixture comprising at least one vinyl ester, ethylene, and a stabilizing system. The stabilizing system comprises at least one polyvinyl alcohol. The monomer mixture comprises from 60 to 82 wt % of the at least one vinyl ester and from 18 to 40 wt % of the ethylene based on the total weight of monomers in the mixture. The stabilizing system comprises from 1 to 5 wt % of at least one medium molecular weight polyvinyl alcohol and at least one low molecular weight polyvinyl alcohol. The emulsion copolymer has a solids content from 50% to 60% and a viscosity ranges from 500 to 6,000 mPa·s. and a formaldehyde content of less than 10 ppm as determined by HPLC.

29 Claims, No Drawings

WATERPROOFING COATING COMPOSITIONS

CROSS-REFERENCE TO RELATED APPLICATIONS

The present Application is a U.S. National Phase of PCT/CN2012/079940 filed on Aug. 10, 2012. The disclosure of the PCT Application is hereby incorporated by reference into the present Application.

FIELD

The present invention relates to waterproof coating compositions. More particularly, the invention relates to cement-based waterproof coating compositions that are free of formaldehyde. More particularly, the coating compositions are made with vinyl ester/ethylene emulsion copolymers, for example vinyl acetate/ethylene, (VAE), emulsion copolymers.

BACKGROUND

Cement-based waterproof coatings are mainly used to prevent water ingression. The waterproofing coatings are brushed or rolled on walls and floors before any decorative layer, such as ceramic tiles, plasters, renders etc., is applied to the surface. After drying, the waterproofing coatings form a dense film which can resist water penetration into the underlying substrates. There have been numerous attempts to improve the performance of waterproofing coatings. One major improvement has been the use of latex modified cement slurries in which a polymeric latex material is added to a cement mortar.

The polymeric latex composition contributes adhesion, tensile strength and elongation properties to the cement-based system. The use of latex polymers in cement systems across a wide variety of concentration levels allows for the production of waterproofing coatings having a wide range of properties. Low levels of latex in cement systems can also improve bonding performance with substrates, especially after rigorous curing conditions, like heat curing, alkali curing etc. Very high levels of latex results in products that exhibit elastomeric qualities. Examples of latex polymers include styrene acrylic, styrene butadiene rubbers, and copolymers of vinyl esters and ethylene. Specifically, copolymers of vinyl acetate and ethylene, (VAE copolymers), are well known as binders that can be added to cement mortar to form cement-based waterproofing coatings. The cement-based waterproofing coating may be used in kitchens or bathrooms by consumers or for exterior walls, basements, roofs and swimming pools by contractors or construction companies.

Typically, a cement-based waterproofing coating includes a liquid component and a solid component, which are mixed together by the consumer or end-user prior to applying the waterproofing coating to the desired surface. The liquid component of the cement-based waterproofing coating includes emulsion copolymers, additional water and plasticizers, such as dibutyl phthalate, (DBP), and dioctyl phthalate, (DOP). The plasticizer is added to improve the elongation and therefore flexibility of the waterproofing coating to avoid cracks. However, it has been reported that plasticizers are potentially harmful to the environment and to humans. Thus, there is interest in formulating waterproofing coatings in which the need for plasticizers is reduced or avoided.

In addition, in an increasing number of applications, industry standards and/or government regulations require that emulsion copolymers be very low in residual monomer content and content of other volatile organic compounds (VOCs). One VOC component which is frequently singled out for specific control is formaldehyde, since formaldehyde is suspected to be a human carcinogen and can be produced by decomposition of some components which are conventionally used in emulsion polymerization processes and products.

Formaldehyde-generating components can include, for example, commonly employed self cross-linking co-monomers such as N-methylolacrylamide. Free formaldehyde can also be released by certain reducing agents such as sodium formaldehyde sulfoxylate used in polymerization initiator systems. Certain emulsion stabilizers used, including, for instance, some types of ethylene oxide-containing surfactants can also form formaldehyde upon oxidation. Formaldehyde formation from polyoxyethylene nonionic surfactants is described, for example, in Bergh et al; *Contact Dermatitis*, Vol. 39, pp. 14-20 (1998).

One method for reducing the free formaldehyde content of copolymer emulsions is to introduce a formaldehyde binding or scavenging agent. U.S. Pat. Nos. 4,472,165; 4,525,492 and 5,143,954 and European Patent No. 647,658 B1 disclose the use of urea, amines and numerous derivatives of such materials as formaldehyde binders or scavengers in various resin products. Commercially available products, such as Celvolit® 149 LV formerly marketed by Celanese, have used urea as a formaldehyde scavenger.

Another approach to overcoming or ameliorating the effects of free formaldehyde released by N-methylol-based self-crosslinking co-monomers in emulsion copolymer dispersions focuses on the redox initiator systems used to prepare such dispersions. In particular, formaldehyde-generating reducing agents in such redox systems can be replaced with other types of reducing agents which do not generate formaldehyde. U.S. Pat. No. 5,540,987, for example, discloses a redox initiator system for vinyl acetate/N-methylol crosslinking co-monomer emulsion binders, which initiator system reduces the free formaldehyde content of the resulting copolymer emulsion. The redox system of the '987 patent comprises a hydrophobic hydroperoxide oxidizing agent in combination with an ascorbic acid or derivative thereof as a reducing agent.

Similar technology is disclosed in U.S. Pat. No. 6,787,594. The '594 patent describes reduced formaldehyde nonwoven binders based on emulsifier-stabilized vinyl acetate/ethylene emulsion copolymers. Such copolymers also contain an N-methylol-based crosslinking co-monomer. Formaldehyde reduction in the binders of the '594 patent is provided by using a selected type of initiator system during polymerization of the emulsion copolymer. In particular, the initiator system disclosed in the '594 patent is a redox system comprising an oxidizing agent, such as a hydrophobic peroxide, and a reducing agent which is a glycol adduct of sodium sulfite. Particularly preferred reducing agents are said to be sulfinic acid compounds such as 2-hydroxy-2-sulfinato-acetic acid-disodium salt. Reducing agents of this preferred type are sold, for example, under the tradename Bruggolite® FF-6.

Another reference which discloses preparation of emulsion polymers using a similar initiator system, and generally also using emulsifiers as stabilizing agents, is U.S. Pat. No. 6,696,519. The '519 patent utilizes a redox initiator system comprising a water-soluble oxidizing agent, a water-insoluble oxidizing agent and a reducing agent derived from sulfinic acid. The '519 patent is concerned with reducing residual monomer levels in the resulting emulsion and does not mention preparation of low formaldehyde emulsion polymers.

Notwithstanding there remains a need for an improved cement-based waterproofing product that is environmentally friendly, i.e., substantially free of formaldehyde and plasticizer.

According to the present invention it has now been found that the improved plasticizer free cement-based waterproofing product may be made by modifying the manufacturing process of the copolymer emulsion. The stabilizing system comprising at least one medium molecular weight polyvinyl alcohol and at least one low molecular weight polyvinyl alcohol beneficially achieves the tensile strength and elongation that meet industry requirements without the use of plasticizer. In addition, a redox-system comprising a sulfinic acid-based reducing agent, either alone or in combination with erythorbic acid or its alkali metal salt as a reducing agent, and t-butyl hydroperoxide, as an oxidizing agent, is an effective formaldehyde-free initiator for the emulsion polymerization of a vinyl ester/ethylene monomer mixture. Therefore, a formaldehyde and plasticizer free cement-based waterproofing coating made in accordance with the present invention may fulfill industry standards and government regulation at higher filler loading levels and with better applicability than current systems.

SUMMARY

In one aspect, the present development is directed to a coating composition that is free of formaldehyde and that is particularly, but not exclusively intended for use in a waterproofing composition. The coating composition comprises an emulsion copolymer of a monomer mixture having at least one vinyl ester, ethylene, a stabilizing system, and a powder composition. The monomer mixture comprises from 60 to 82 wt % of at least one vinyl ester and from 18 to 40 wt % of ethylene based on the total weight of monomers in the mixture. The stabilizing system comprises from 1 to 5 wt % at least one medium molecular weight polyvinyl alcohol and up to 5 wt % at least one low molecular weight polyvinyl alcohol. The emulsion copolymer has a solids content from 50% to 60% and a viscosity ranging from 500 to 6,000 mPa·s. The emulsion copolymer has a formaldehyde content of less than 5 ppm as determined by HPLC. When used in a waterproofing composition, a filler will normally be combined with the emulsion copolymer.

DETAILED DESCRIPTION

As used herein, the term "medium molecular weight polyvinyl alcohol" means a polyvinyl alcohol having a Höppler viscosity at 25° C. and at a 4% concentration aqueous solution by weight of from 20 to 36 mpa·s as measured by a Höppler viscometer.

As used herein, the term "low molecular weight polyvinyl alcohol" means a polyvinyl alcohol having a Höppler viscosity at 25° C. and at a 4% concentration aqueous solution by weight of from 3 to 10 mpa·s as measured by a Höppler viscometer.

In general the present invention relates to a coating composition which, in one embodiment, is intended to be mixed with a filler, such as cement, to produce a waterproofing composition. In other embodiments, the coating composition can be formulated into general purpose adhesive compositions. The coating compositions comprises an emulsion copolymer which is produced from a monomer mixture comprising a vinyl ester and ethylene and which is stabilized with a specific combination of low and medium molecular weight polyvinyl alcohols.

The inventive waterproofing coating composition is substantially free of formaldehyde. Typically, plasticizers are used in waterproofing compositions to improve the elongation and flexibility of the waterproofing coating. The inventors have found that the inventive waterproofing coating composition surprisingly and unexpectedly achieves the elongation and flexibility without the addition of plasticizers. Furthermore, the inventors have found that the use of a mixture of medium molecular weight polyvinyl alcohol and low molecular weight polyvinyl alcohol beneficially achieved the tensile strength and elongation that meet industry requirements (JSI and JSII) without the need of adding plasticizer to the mixture. In one embodiment, the waterproofing composition has a ratio of filler to polymer of greater than 1.5:1 to achieve JSI requirements. In another embodiment, the waterproofing composition has a ratio of filler to polymer of greater than 2.3:1 to achieve JSII requirements. The inventors also have found that the use of a particular free radical redox polymerization initiator system yields a substantially formaldehyde free emulsion polymers. As such, the inventive cement-based waterproofing coating is free of formaldehyde and does not require the use of plasticizers to achieve industry requirements.

The monomers mixture, the stabilizer system and the polymerization process employed to produce the present coating composition are all described in detail as follows:

Essential Co-Monomers

The aqueous dispersions herein essentially comprise a vinyl ester/ethylene copolymer. The vinyl ester(s) employed is/are generally vinyl ester(s) of an aliphatic or aromatic carboxylic acid having 1 to 18 carbon atoms. Examples include vinyl esters of aliphatic carboxylic acids having 1 to 8 carbon atoms, such as, for example, vinyl formate, vinyl acetate, vinyl propionate, vinyl isobutyrate, vinyl pivalate and vinyl 2-ethylhexanoate. Suitable monomers also include vinyl esters of saturated, branched monocarboxylic acids having 9, 10 or 11 carbon atoms in the acid radical, e.g., Versatic™ acid, and vinyl esters of relatively long-chain, saturated and unsaturated fatty acids, for example vinyl esters of fatty acids having 8 to 18 carbon atoms, such as, for example, vinyl laurate and vinyl stearate. Vinyl acetate, vinyl esters of Versatic™ acid and vinyl laurate are preferred. Vinyl acetate is particularly preferred. Exemplary vinyl esters of aromatic acids include esters of benzoic acid, 4-tert-butylbenzoic acid, or mixtures thereof.

The vinyl ester component is typically present in the copolymer in an amount between about 60 wt % and about 82 wt % based on the total weight of monomers. More preferably, the vinyl ester will be vinyl acetate which will comprise from about 65 wt % to about 78 wt % of the copolymer, based on total weight of monomers. The ethylene component is generally present in the copolymer in an amount from about 18 wt % to about 40 wt %, such as from about 22 wt % to about 35 wt %, for example from about 24 wt % to about 33 wt %, of the total monomer weight.

Optional Co-Monomers

In addition to a vinyl ester and ethylene, the monomer mixture may optionally include one or more additional functional monomers added to improve the properties of the final copolymer dispersion. Such optionally present, functional co-monomers can include ethylenically unsaturated acids, e.g. mono- or di-carboxylic acids, sulfonic acids or phosphonic acids. In place of the free acids, it is also possible to use their salts, preferably alkali metal salts or ammonium salts. Examples of optional functional co-monomers of this type include acrylic acid, methacrylic acid, crotonic acid, maleic acid, fumaric acid, itaconic acid, vinylsulfonic acid, vinylphosphonic acid, monoesters of maleic and/or fumaric acid, and of itaconic acid, with monohydric aliphatic saturated alcohols of chain length $C_1$-$C_{18}$, and also their alkali metal salts and ammonium salts, or (meth)acrylic esters of sulfoalkanols, an example being sodium 2-sulfoethyl methacrylate.

Other types of suitable optional functional co-monomers include ethylenically unsaturated co-monomers with at least one amide-, epoxy-, hydroxyl, trialkoxysilane- or carbonyl group. Particularly suitable are ethylenically unsaturated epoxide compounds, such as glycidyl methacrylate or glycidyl acrylate. Also suitable are hydroxyl compounds including methacrylic acid and acrylic acid $C_1$-$C_9$ hydroxyalkyl esters, such as n-hydroxyethyl, n-hydroxypropyl or n-hydroxybutyl acrylate and methacrylate. Other suitable functional co-monomers include compounds such as diacetone acrylamide and acetylacetoxyethyl acrylate and methacrylate; and amides of ethylenically unsaturated carboxylic acids, such as acrylamide or meth acrylamide.

Optional functional co-monomers can be incorporated into the vinyl ester/ethylene emulsion copolymers of the aqueous dispersions herein in amount of up to about 5 wt %, based on total main co-monomers in the copolymer. More preferably, optional functional co-monomers can comprise from about 0.5 wt % to about 2 wt %, based on total main co-monomers in the copolymer.

Emulsion Stabilizing System

The emulsion stabilizing system employed in the present coating composition comprises at least one medium molecular weight polyvinyl alcohol and at least one low molecular weight polyvinyl alcohol. The medium molecular weight polyvinyl alcohol is generally present in the coating composition in an amount between 1 and 5 wt % based on the total monomer weight and the low molecular weight polyvinyl alcohol is generally present in the coating composition in an amount up to 10 wt %, preferably up to 5 wt % based on the total monomer weight.

One convenient measure of the molecular weight of a polyvinyl alcohol is the Hoppler viscosity of a 4 wt % aqueous solution of the polyvinyl alcohol. Thus the medium molecular weight polyvinyl alcohol employed herein has a Hoppler viscosity at 4 wt % concentration of from 20 to 36 mPa·s, whereas the low molecular weight polyvinyl alcohol employed herein has a Hoppler viscosity at 4 wt % concentration of from 3 to 10 mPa·s. These Hoppler viscosity measurements are made at 25° C. using a Höppler viscometer.

Generally, the or each medium molecular weight polyvinyl alcohol has a degree of hydrolysis of 85 to 90 mole % and the or each low molecular weight polyvinyl alcohol has a degree of hydrolysis of 75 to 90 mole %. In one embodiment, the stabilizing system comprises at least two low molecular weight polyvinyl alcohols having different degrees of hydrolysis, for example, a first with a degree of hydrolysis from 85 to 90 mole % and a second with a different degree of hydrolysis from 75 to 85 mole %.

One example of a suitable commercially available medium molecular weight polyvinyl alcohol is Celvol 523, supplied by Sekisui Chemical Company Ltd. Celvol 523 has a degree of hydrolysis of about 87-89 mole % and a Hoppler viscosity at 4% of from about 23 to 27 mPa·s at 25° C.

Polyvinyl alcohols having low molecular weight are also commercially available. For example, Gohsenol KL05 supplied by The Nippon Synthetic Chemical Industry Company Ltd. has a degree of hydrolysis of about 78.5 mol % to about 82.0 mole % and a Hoppler viscosity at 4% concentration in water of from about 4.0 to about 5.0 mPa·s at 25° C.

Other commercially available polyvinyl alcohols of low molecular weight are Celvol E 4/88 and Celvol E 4/88 LA, supplied by Sekisui Chemical Company Ltd. Celvol E 4/88 and Celvol E 4/88 LA have a degree of hydrolysis of about 87-89 mole % and a Hoppler viscosity at 4% of from about 4.0 to 5.0 mPa·s at 25° C.

Another commercially available polyvinyl alcohol of the low molecular weight is Celvol 205, also supplied by Sekisui Chemical Company Ltd. Celvol 205 also has a degree of hydrolysis of about 87 to 89 mole % and a Hoppler viscosity at 4% of from about 4.6 to 5.4 mPa·s at 25° C.

Surfactant

Although not required, in some embodiments, a surfactant may be used in the present emulsion copolymer. Suitable surfactants comprise nonionic surfactants, several of which are described in U.S. Pat. No. 5,849,389, the entirety of which is incorporated herein by reference. See also C. Chern, *Principles and Applications of Emulsion Polymerization*, Wiley & Sons, Inc., (2008), the entirety of which is incorporated herein by reference.

Suitable nonionic surfactants include polyoxyethylene condensates. Exemplary polyoxyethylene condensates which can be used include polyoxyethylene aliphatic ethers, such as polyoxyethylene lauryl ether and polyoxyethylene oleyl ether; polyoxyethylene alkaryl ethers, such as polyoxyethylene nonylphenol ether and polyoxyethylene octylphenol ether; polyoxyethylene esters of higher fatty acids, such as polyoxyethylene laurate and polyoxyethylene oleate, as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thioethers such as polyoxyethylene n-dodecyl thio-ether. In some aspects, the nonionic surfactant comprises ethoxylated fatty alcohols (EO degree: 3 to 50, alkyl residue: $C_8$-$C_{36}$), ethoxylated mono-, di- and trialkyl phenols (EO degree: 3 to 50, alkyl residue: $C_4$-$C_{10}$) or polyethylene oxide/polypropylene oxide block copolymers. In some aspects, an ethoxylated nonionic surfactant is employed that does not include ethoxylated nonionics based on alkyl phenols. Preferably, the emulsion copolymer may include an alkylphenol-free surfactant. In a preferred embodiment, the nonionic surfactant is an alcohol ethoxylate of a $C_9$ to $C_{18}$ alcohol with 3 to 50 moles of ethylene oxide, e.g., with 7 to 40 moles. In one embodiment, the emulsion blend comprises a nonionic surfactant in an amount of 0.1 to 2 wt % based on total monomer weight.

Nonionic surfactants that can be used also include polyoxyethylene/polypropylene oxide block copolymers, such as PLURONIC™ and TETRONIC™ emulsifiers from BASF. In addition, a series of ethylene oxide adducts of acetyleneic glycols, sold commercially under the Surfynol™ trade name, are suitable as nonionic emulsifiers.

Redox Initiator System

The monomer mixtures which are polymerized to form the aqueous copolymer dispersions herein will also contain a selected type of redox initiator system to facilitate the polymerization reaction. Such an initiator system will comprise a hydrophobic oxidizing agent and a sulfinic acid, or salts thereof, as a reducing agent.

Typically, from about 0.01% to about 2.0%, preferably from about 0.02% to about 1.0%, more preferably from about 0.025% to about 0.5%, by weight based on total weight of co-monomers, of a hydrophobic oxidizing agent is used in the redox initiator system. By "hydrophobic oxidizing agent" herein is meant an oxidizing agent which has a water solubility of less than 20% by weight in water at 25° C.

Suitable hydrophobic oxidizing agents include, for example, benzoyl peroxide, lauryl peroxide, t-butyl peroxide, t-butyl hydroperoxide, 2,2'-azobisisobutyronitrile, t-amyl hydroperoxide, t-butyl peroxyneodecanoate, and t-butyl peroxypivalate. The most preferred hydrophobic oxidizing agent for use in the initiator systems herein is t-butyl hydroperoxide.

The redox polymerization initiator systems herein may also optionally comprise a conventional water-soluble oxidizing agent. Suitable water-soluble oxidizing agents include, for example, hydrogen peroxide and the ammonium or alkali metal persulfates, perborates, peracetates, peroxides, and percarbonates.

The redox initiator systems used herein will also comprise a reducing agent based on one or more sulfinic acids, ascorbic acid, erythorbic acid or alkali metal salts thereof. Sulfinic acid derivatives including the glycolic acid adducts of sulfinic acid are suitable reducing agents for use herein, Typically such reducing agents are used at levels of from about 0.01% to about 2.0%, preferably from about 0.02% to about 1.0%, more preferably from about 0.025% to about 0.5%, based on total weight of co-monomers. Specific examples of suitable sulfinic acid-based reducing agents include hydroxyphenyl hydroxymethyl sulfinic acid-sodium salt; 4-methoxyphenyl hydroxymethyl sulfinic acid-sodium salt; 2-hydroxy-2-sulfinato acetic acid-disodium salt; 2-hydroxy-2-sulfinato acetic acid-zinc salt; 2-hydroxy-2-sulfinato propionate-disodium salt; ethyl 2-hydroxy-2-sulfinato propionate-sodium salt and combinations of such reducing agents.

The reducing agent can further comprise at least one sulfonic acid compound which corresponds to sulfinic acid-based compound(s) used, with or without the corresponding sulfite also being present as part of the reducing agent. An especially preferred reducing agent of this type comprises a combination of 2-hydroxy-2-sulfinato acetic acid-disodium salt and 2-hydroxy-2-sulfonato acetic acid-disodium salt, with or without sodium sulfite. Reducing agents of this type are commercially available under the tradenames Bruggolite® FF6 and FF7 from L. Brüggemann KG. Such reducing agents are more fully described in U.S. Pat. Nos. 6,211,400; 6,586,622 and 6,787,594, all of which patents are incorporated herein by reference.

The redox initiator systems used herein can also optionally comprise catalyzing metal salts of iron, copper, manganese, silver, platinum, vanadium, nickel, chromium, palladium, or cobalt. These catalyzing salts may be used at levels of from about 0.01 to about 25 ppm, with or without metal complexing agents. Preferably iron or copper may be used.

Polymerization Procedures and Conditions

The PVOH-stabilized copolymer dispersions described herein can be prepared using emulsion polymerization procedures which result in the preparation of polymer dispersions in aqueous latex form. Such preparation of aqueous polymer dispersions of this type is well known and has already been described in numerous instances and is therefore known to the skilled artisan. Such procedures are described, for example, in U.S. Pat. No. 5,633,334, and in the *Encyclopedia of Polymer Science and Engineering*, Vol. 8, p. 659 ff (1987). The disclosures of both of these publications are incorporated herein by reference in their entirety.

The polymerization may be carried out in any manner known per se in one, two or more stages with different monomer combinations, giving polymer dispersions having particles with homogeneous or heterogeneous, e.g., core shell or hemispheres, morphology. Any reactor system such as batch, loop, continuous, cascade, etc, may be employed.

The polymerization temperature generally ranges from about 20° C. to about 150° C., more preferably from about 50° C. to about 120° C. The polymerization generally takes place under pressure if appropriate, preferably from about 2 to about 150 bar, more preferably from about 5 to about 100 bar.

In a typical polymerization procedure involving, for example, vinyl acetate/ethylene copolymer dispersions, the vinyl acetate, ethylene, stabilizing system and other co-monomers can be polymerized in an aqueous medium under pressures up to about 120 bar in the presence of one or more initiators. The aqueous reaction mixture in the polymerization vessel can be maintained by a suitable buffering agent at a pH of about 2 to about 7.

The manner of combining the several polymerization ingredients, i.e., stabilizing system, co-monomers, initiator system components, etc., can vary widely. Generally an aqueous medium containing at least part of the stabilizing system can be initially formed in a polymerization vessel with the various other polymerization ingredients being added to the vessel thereafter.

Co-monomers can be added to the polymerization vessel continuously, incrementally or as a single charge addition of the entire amounts of co-monomers to be used. Co-monomers can be employed as pure monomers or can be used in the form of a pre-mixed emulsion. Ethylene as a co-monomer can be pumped into the polymerization vessel and maintained under appropriate pressure therein.

It is possible for the total amount of redox initiator system to be included in the initial charge to the reactor at the beginning of the polymerization. Preferably, however, a portion of the initiator is included in the initial charge at the beginning, and the remainder is added after the polymerization has been initiated, in one or more steps or continuously. It is also possible to start the emulsion polymerization using a seed latex, for example with about 0.5 to about 15% by weight of the polymerization mixture.

Dispersion Characteristics

The aqueous copolymer dispersions as prepared herein will generally have a viscosity of at least about 500 mPa·s at 55% solids and 25° C., as measured with a Brookfield viscometer at 20 rpm, with spindle 3. Preferably, viscosity so measured will range from about 1000 to about 7000 mPa·s, more preferably from about 2000 to about 6000 mPa·s. Viscosity may be adjusted by the addition of thickeners and/or water to the copolymer dispersion. Suitable thickeners can include polyacrylates or polyurethanes, such as Borchigel L75® and Tafigel PUR 60®. Alternatively, the copolymer dispersion may be substantially free of thickeners.

Following polymerization, the solids content of the resulting aqueous copolymer dispersions can be adjusted to the level desired by the addition of water or by the removal of water by distillation. Generally, the desired level of polymeric solids content after polymerization is from about 40 wt % to about 70 wt % based on the total weight of the polymer dispersion, more preferably from about 45 wt % to about 65 wt %, most preferably from about 50 wt % to 60 wt %, or even from about 52.5 wt % to about 57.5 wt %. The polymeric solids in the dispersion will generally have an average particle size ranging from about 0.5 μm to about 5 μm. (Particle size can be measured using a Malvern Mastersizer.)

The aqueous copolymer dispersions herein will be very low in formaldehyde content and thus appropriate for formulation into products suitable for uses that require formaldehyde-free products or at least products which are very low in measurable formaldehyde. Formaldehyde content can be determined using Test Method ISO-15173 described in greater detail in the Test Methods section herein after.

The aqueous dispersions herein will generally have a formaldehyde content as determined using HPLC of less than about 10 ppm by weight, and more preferably less than about 5 ppmw. Most preferably, the formaldehyde content of the aqueous dispersions herein will be about 1.0 ppmw or less when determined in accordance with such testing.

Cement Based Coating Compositions

In one embodiment the copolymer emulsion described above is formulated into a cement based coating composition by mixing with solid component, i.e. filler. The cement-base water proofing composition is prepared by mixing a certain ratio of solid component and liquid component. The solid component may comprise various hardening agents in powder form. For example, the hardening agents may be selected from the group consisting of cement, calcium carbonate, magnesium carbonate, sand, silicates, other minerals, and additives, (such as cellulose ether, super-plasticizer, defoamer etc.), and mixtures thereof. In one embodiment, the ratio of filler to polymer solids is from 1:1 to 3:1. In one embodiment, the cement based coating composition has a ratio of filler to polymer solids of greater than 1.5:1 to achieve JSI requirements. In one embodiment, the cement based coating composition has a ratio of filler to polymer solids of greater than 2.3:1 to achieve JSII requirements. JSI and JSII requirements are part of the Chinese National Standard for 2 Component Waterproofing Coatings. The requirements of both requirements are summarized below.

Adhesive Formulations

In addition to having utility in the production of waterproofing compositions, the present emulsion polymer may also be formulated into general purpose adhesives. The aqueous vinyl ester/ethylene copolymer dispersions described herein may be combined with additives which are typical for use in the production of dispersion-based adhesives. Suitable additives include, for example, film-forming assistants, such as white spirit, Texanol®, TxiB®, butyl glycol, butyldiglycol, butyldipropylene glycol, and butyltripropylene glycol, toluene; plasticizers, such as dimethyl phthalate, dibutyl phthalate, diisobutyl phthalate, diisobutyl adipate, diethylene glycol dibenzoate, dipropylene glycol dibenzoate, triethylene glycol dibenzoate, Coasol B®, Plastilit 3060®, and Triazetin®; wetting agents, such as AMP 90®, TegoWet.280®, Fluowet PE®; thickeners, such as polyacrylates or polyurethanes, such as Borchigel L759® and Tafigel PUR 60®; defoamers, such as mineral oil defoamers or silicone defoamers; UV protectants, such as Tinuvin 1130®, subsequently added stabilizing polymers, such as polyvinyl alcohol or cellulose ethers, and other additives and auxiliaries of the kind typical for the formulation of adhesives.

The fraction of the foregoing additives in the final dispersion-based adhesive can be up to 25% by weight, preferably 2% to 15% by weight, and in particular 5% to 10% by weight, based on the dispersion. When the dispersions herein are formulated into adhesives for use in or with solid materials, such adhesives are generally formulated only with additional PVOH and no additional solvents, plasticizers or mineral oils.

Examples of suitable substrates that can be bonded using the present formaldehyde and plasticizer free adhesives include paper, metals, plastics, paint surfaces, textiles, nonwovens or natural substances, such as wood. The substrates to be bonded may possess absorbent surfaces or hydrophobic surfaces. Examples of absorbent surfaces are papers, including paperboard and cardboard, and other fiber webs. Examples of hydrophobic surfaces are polymeric films (e.g., polyester film, polyolefin film such as polypropylene or polyethylene, for example, polystyrene film, acetate film) or papers with a UV varnish coating. As noted, the preferred utility for the adhesive products herein is for a waterproofing cement adhesive, by virtue of the very low formaldehyde content which is required by industry standards.

EXAMPLES

The invention will now be more particularly described with reference to the following non-limiting Examples.

Test Methods

Solids Content

Solids content was measured by drying 1 to 2 g of the aqueous dispersion at 105° C. for 4 hours, then dividing the weight of dried polymer by the weight of dispersion.

Viscosity

Viscosity of the copolymer emulsion was determined at 25° C. using a Brookfield DV-I+ Viscometer, spindle 2, spindle 3 or spindle 4, at a speed of 20 rpm. Example 2 below uses spindle 2, Examples 5 and 6 use spindle 4, and the rest of the examples use spindle 3.

Grit

Grit was determined by filtering 100 g of dispersion through a 40μ filter, drying and weighing the dried grit. This is expressed as a % on the wet dispersion. When the viscosity of the dispersion was high, it was first diluted with 100 g of water.

Glass Transition Temperature

Determination of the Glass Transition Temperature, (Tg), was according to ASTM E 1356 by Differential Scanning Calorimetry, (DSC), using a Mettler DSC 820 with a fluid $N_2$ cooling system. The tested range was from −80° C. to 130° C. with a heating rate of 10° C./min. Both the onset and midpoint of the Tg is quoted.

Formaldehyde Content

The formaldehyde content was determined according to ISO 15173 for measuring the free formaldehyde in polymer dispersions. The aqueous phase was separated by centrifugation, then the free formaldehyde was complexed by reacting with acetyl acetone, (Nash reagent), then the complex was analysed by HPLC with a UV detector.

Formulations for Application Testing

The following formulations were used to prepare the compositions to test according to JSI and JSII requirements:

| Liquid Component | | |
|---|---|---|
| | JS I | JS II |
| Emulsion, (at ca. 55% solids) | 850 | 800 |
| Wetting Agent | 2 | 2 |

Liquid Component

|  | JS I | JS II |
|---|---|---|
| Cellulosic Thickener | 3 | 3 |
| Water | 145 | 195 |
| Total | 1000 | 1000 |

Particulate Filler Component

|  | JS I | JS II |
|---|---|---|
| Portland Cement, (42.5) | 300 | 300 |
| Calcium Carbonate, (325#) | 200 | 200 |
| Quartz Sand, (200#) | 500 | 200 |
| Quartz Sand, (80-120#) | — | 300 |
| Total | 1000 | 1000 |

The liquid and powder components were mixed in various ratios. Testing was carried out according to Chinese standard GB23445-2009.

Film Preparation

Ambient conditions in the laboratory were 23±2° C. and 50±10% relative humidity.

According to the required mixing ratio, appropriate quantities of liquid and powder were mixed using a disperser for 5 minutes. After resting, a film with a wet thickness of 1.5 mm was applied on a silica gel plate using a film maker. After drying for 12-24 hours, a second film was applied on top, and allowed to dry for 96 hours. The film was then peeled from the substrate and further dried in an oven for 48 hours at 40±2° C. The film was removed from the oven and placed in a desiccator to cool to room temperature.

The films were then cut to size and conditioned as follows:

Uncured: 6× samples, cut to a dumb-bell shape, 25 mm by 6 mm, (according to GB/T528-1998), and tested immediately.

Heat treated: 6× samples, cut to a dumb-bell shape, 25 mm by 6 mm, cured for 168 hours in an oven at 80±2° C., then allowed to cool to room temperature in a desiccator.

Alkali-treated: 6× samples cut to 120 mm by 25 mm, immersed in alkali solution for 168 hours, cleaned then dried in an oven for 18 hours at 60±2° C., then finally cut to a dumb-bell shape, 25 mm by 6 mm. The alkali solution is a 0.1% sodium hydroxide solution, supersaturated with calcium hydroxide.

Water treatment: 6× samples cut to 120 mm by 25 mm, immersed in water for 168 hours at 23±2° C., then dried in an oven for 18 hours at 60±2° C., then finally cut to a dumb-bell shape, 25 mm by 6 mm.

Tensile and Elongation Testing

The films as prepared above were tested according to GB/T16777-2008 using an Instron 5543/H1031 tensiometer at a force speed of 200 mm/minute.

The tensile strength and % elongation requirements to pass JSI and JSII standards are summarized in the table:

|  | JS I | JS II |
|---|---|---|
| Tensile strength uncured, (MPa.) | ≥1.2 | ≥1.8 |
| Elongation uncured, (%) | ≥200 | ≥80 |
| Tensile strength retention after heat treatment, (% of uncured value) | ≥80 | ≥80 |
| Elongation after heat treatment, (%) | ≥150 | ≥65 |
| Tensile strength retention after alkali treatment, (% of uncured value) | ≥60 | ≥70 |
| Elongation after alkali treatment, (%) | ≥150 | ≥65 |
| Tensile strength after water treatment, (% of uncured value) | ≥60 | ≥70 |
| Elongation after water treatment, (%) | ≥150 | ≥65 |

Low Temperature Flexibility Testing

Testing of low temperature flexibility was carried out only for compliance with JSI. 3× samples of film were prepared as described above, cut to 100 mm by 25 mm, and placed in a freezer for 1 hour at −10° C. A cylindrical metal rod with a diameter of 10 mm was also placed in the freezer for 1 hour at −10° C. The film was then bent around the metal rod to an angle of 180° in 3 seconds. To pass, the film should remain intact and exhibit no cracking.

Bonding Strength Testing

On blocks of mortar substrate with dimensions of 70 mm×70 mm×20 mm, a film of formulated waterproofing coating was applied to give a dry film thickness of 1.5 mm. The films were dried under ambient conditions for 96 hours, then dried in an oven at 40±2° C. for 48 hours, then allowed to cool for 4 hours under ambient conditions before further conditioning and testing as described below:

Uncured: tested immediately.

Wet substrate: the mortar block was wet before applying and curing the waterproofing film as described above.

Alkali-treated: the sides of the mortar block were sealed with epoxy resin, then it was immersed in alkali solution for 168 hours, cleaned then dried in an oven for 18 hours at 60±2° C., then conditioned for a further 2 hours at ambient. The alkali solution is a 0.1% sodium hydroxide solution, supersaturated with calcium hydroxide.

Water treatment: the mortar block was placed in water for 168 hours at 23±2° C. to a depth 5 mm below the waterproofing film, then dried in an oven for 18 hours at 60±2° C., then conditioned for a further 2 hours at ambient.

The bonding strength was then measured using an LBY tensiometer, (supplied by the China Building Material Test & Certification Centre), with a force speed of 5 mm/min. The bonding strength should be ≥0.7 MPa. for all curing conditions.

Water Impermeability of Film

A film was prepared and conditioned as described above and cut to 150 mm by 150 mm. Testing was carried out according to GB16777-2008. To pass, the film must withstand a hydrostatic pressure of 0.3 MPa. for 30 minutes with no water bleeding through the film.

Anti-Water Permeability of Film

A mortar substrate was selected which had previously been tested and had an anti-water permeability of 0.3 to 0.4 MPa. A film of the waterproofing coating was applied 2× times to obtain a dry film thickness of 1.0 to 1.2 mm on the mortar block. The test piece was then dried for 168 hours at 20±1° C., RH≥90%. The anti-water permeability test (3 test pieces) was then carried out using an SJS-1.5S made by Wuxi Construction Equipment Co. The test started at a water pressure of 0.2 MPa for 2 hours, then increase pressure by 0.1 MPa every one hour. To pass, two of the three test pieces must withstand a water pressure of 0.6 MPa.

Example 1

Comparative Example

Example 1 is a comparative example of a commercially available Vinyl Acetate/Ethylene copolymer dispersion sold for 2K Waterproofing, Celvolit 1318, (manufactured by Celanese Emulsion Polymers). Celvolit 1318 is a polyvinylalcohol stabilized with 54-56% solids content, viscosity of 3200-4400 mPa·s and a Tg, (mid-point), of 9° C. For any subsequent application testing, it was formulated by the addition of dibutylphthalate, (DBP).

Example 2

Comparative Example

Preparation of a Vinyl Acetate/Ethylene Copolymer Dispersion

VA/E Weight Ratio=75/25
PVOH Stabilizer=Celvol E 4/88 (5.4 pphm)

An aqueous solution was prepared by the addition of 1149.6 g of a 25% aqueous solution of polyvinylalcohol, having a hydrolysis degree of 87-89% and a Hoppler viscosity at 4% concentration of 4.0 to 5.0 mPa·s at 25° C., (Celvol E 4/88), 1.38 g of Brueggolite FF6 and 1.70 g of a defoamer, (Agitan 282), to 2714.4 g of deionised water whilst stirring. 1.7 g of a 4% active solution of ferric chloride was added, then the pH was adjusted to pH 4.2 by the use of phosphoric acid. Then the aqueous solution was charged to a 10-liter pressure reactor equipped with a stirrer, dosage pumps and a mass flow meter for dosing ethylene. The reactor was degassed by twice evacuating, then pressurising with nitrogen to 2 bar, then finally evacuating. The stirrer was set to 600 rpm.

The reactor was heated to 36° C. 1995.9 g of vinyl acetate was pumped to the reactor. Then 665.3 g of ethylene was metered to the reactor.

When the reactor temperature and pressure stabilized at 36° C. the additions of a reducer solution comprising 9.26 g of Brueggolite FF6 and 2.61 g of sodium bicarbonate in 207.6 g of deionized water was commenced at a dosage rate of 43.9 g/hour and an oxidiser solution comprising 11.41 g of 70% active t-butylhydroperoxide dissolved in 201.8 g of deionised water was commenced at a dosage rate of 42.6 g/hour. After detection of a temperature increase of 2° C., the jacket temperature was increased so that the internal reactor temperature increased to 85° C. in 30 minutes. When the internal reactor temperature reached 80° C., the slow addition of a further 1995.9 g of vinyl acetate commenced over 155 minutes. When the reactor temperature reached 85° C., the slow addition of a further 665.3 g of ethylene commenced, maintaining the reactor pressure at 65 bar.

The jacket temperature was allowed to vary to keep the internal temperature at 85° C. After the addition of vinyl acetate was complete, the redox addition rates were maintained until the exotherm began to die. When the jacket temperature had increased to 70° C., the redox addition rates were doubled, and the internal temperature kept at 85° C. by allowing the jacket temperature to further increase.

After all additions were complete, the reaction mixture was cooled to 55° C. and transferred to a stripping vessel equipped with a stirrer, (operating at 200 rpm), and vacuum. When 50% had been transferred, a solution comprising 1.97 g of Brueggolite FF6 and 1.7 g of defoamer, (Agitan 282), in 126.4 g of deionised water was added. Once all of the reactor contents were transferred a solution comprising 1.22 g of 70% active t-butylhydroperoxide and 2.84 g of 30% active hydrogen peroxide in 138.4 g of deionised water was added, and the stripper was kept at 50° C. for 30 minutes. The stripper contents were cooled to 20° C. and discharged. The resultant dispersion was filtered through a 180µ mesh.

The resultant dispersion had a solids content of 56.2%, viscosity of 432 mPa·s, pH of 5.6, grit, (measured on a 40µ mesh), of 0.026%, a Tg, (by DSC), of −16.3° C. onset/−7.2° C. mid-point, and a formaldehyde content by HPLC of 0.1 ppm.

Example 3

Preparation of a Vinyl Acetate/Ethylene Copolymer Dispersion

VA/E Weight Ratio=75/25
PVOH Stabilizer=Celvol E 4/88 (3.6 pphm)/Celvol 523 (1.8 pphm)

The procedure of example 2 was followed except that the aqueous solution initially charged to the reactor was prepared by the addition of 766.4 g of a 25% aqueous solution of polyvinylalcohol, having a hydrolysis degree of 87-89% and a Hoppler viscosity at 4% concentration of 4.0 to 5.0 mPa·s at 25° C., (Celvol E 4/88), 638.7 g of a 15% aqueous solution of polyvinylalcohol, having a hydrolysis degree of 87-89% and a Hoppler viscosity at 4% concentration of 20 to 26 mPa·s at 25° C., (Celvol 523), 1.38 g of Brueggolite FF6 and 1.70 g of a defoamer, (Agitan 282), to 2458.9 g of deionised water whilst stirring. 1.7 g of a 4% active solution of ferric chloride was added, then the pH was adjusted to pH 4.2 by the use of phosphoric acid.

The resultant dispersion had a solids content of 56.4%, viscosity of 3500 mPa·s, pH of 5.5, grit, (measured on a 40µ mesh), of 0.008%, a Tg, (by DSC), of −14.2° C. onset/−4.9° C. mid-point, and a formaldehyde content by HPLC of 2 ppm.

Example 4

Preparation of a Vinyl Acetate/Ethylene Copolymer Dispersion

VA/E Weight Ratio=75/25
PVOH Stabilizer=Gohsenol KL05 (3.6 pphm)/Celvol 523 (1.8 pphm)

The procedure of example 2 was followed except that the aqueous solution initially charged to the reactor was prepared by the addition of 958.0 g of a 20% aqueous solution of polyvinylalcohol, having a hydrolysis degree of 78.5-82% and a Hoppler viscosity at 4% concentration of 4.0 to 5.0 mPa·s at 25° C., (Gohsenol KL05), 638.7 g of a 15% aqueous solution of polyvinylalcohol, having a hydrolysis degree of 87-89% and a Hoppler viscosity at 4% concentration of 20 to 26 mPa·s at 25° C., (Celvol 523), 1.38 g of Brueggolite FF6 and 1.70 g of a defoamer, (Agitan 282), to 2267.3 g of deionised water whilst stirring. 1.7 g of a 4% active solution of ferric chloride was added, then the pH was adjusted to pH 4.2 by the use of phosphoric acid.

The resultant dispersion had a solids content of 56.2%, viscosity of 3950 mPa·s, pH of 5.7, grit, (measured on a 40µ mesh), of 0.005%, a Tg, (by DSC), of −14.6° C. onset/−5.8° C. mid-point, and a formaldehyde content by HPLC of 0.1 ppm.

Example 5

Preparation of a Vinyl Acetate/Ethylene Copolymer Dispersion

VA/E Weight Ratio=75/25
PVOH Stabilizer=Gohsenol KL05 (1.8 pphm)/Celvol 205 (1.8 pphm)/Celvol 523 (1.8 pphm)

The procedure of example 2 was followed except that the aqueous solution initially charged to the reactor was prepared by the addition of 479.0 g of a 20% aqueous solution of polyvinylalcohol, having a hydrolysis degree of 78.5-82% and a Hoppler viscosity at 4% concentration of 4.0 to 5.0 mPa·s at 25° C., (Gohsenol KL05), 479.0 g of a 20% aqueous solution of polyvinylalcohol, having a hydrolysis degree of 87-89% and a Hoppler viscosity at 4% concentration of 4.6 to 5.4 mPa·s at 25° C., (Celvol 205), 638.7 g of a 15% aqueous solution of polyvinylalcohol, having a hydrolysis degree of 87-89% and a Hoppler viscosity at 4% concentration of 20 to 26 mPa·s at 25° C., (Celvol 523), 1.38 g of Brueggolite FF6 and 1.70 g of a defoamer, (Agitan 282), to 2267.3 g of deionised water whilst stirring. 1.7 g of a 4% active solution of ferric chloride was added, then the pH was adjusted to pH 4.2 by the use of phosphoric acid.

The resultant dispersion had a solids content of 56.3%, viscosity of 5060 mPa·s, pH of 5.6, grit, (measured on a 40μ mesh), of 0.008%, a Tg, (by DSC), of −15.9° C. onset/−6.4° C. mid-point, and a formaldehyde content by HPLC of 0.1 ppm.

Example 6

Preparation of a Vinyl Acetate/Ethylene Copolymer Dispersion

VA/E Weight Ratio=72/28
PVOH Stabilizer=Gohsenol KL05 (1.8 pphm)/Celvol 205 (1.8 pphm)/Celvol 523 (1.8 pphm)

The procedure of example 5 was followed except that 1916.1 g of vinyl acetate and 745.1 g of ethylene were initially charged to the reactor. 1916.1 g of vinyl acetate and 745.1 g of ethylene were slow-added.

The resultant dispersion had a solids content of 56.1%, viscosity of 5900 mPa·s, pH of 5.6, grit, (measured on a 40μ mesh), of 0.006%, a Tg, (by DSC), of −18.8° C. onset/−10.4° C. mid-point, and a formaldehyde content by HPLC of 0.1 ppm.

Example 7

Preparation of a Vinyl Acetate/Ethylene Copolymer Dispersion

VA/E Weight Ratio=75/25
PVOH Stabilizer=Celvol E 4/88 LA (3.0 pphm)/Celvol 523 (1.5 pphm)
Nonionic Surfactant=Emulsogen EPN 287 (0.67 pphm)

An aqueous solution was prepared by the addition of 640.8 g of a 25% aqueous solution of polyvinylalcohol, having a hydrolysis degree of 87-89% and a Hoppler viscosity at 4% concentration of 4.0 to 5.0 mPa·s at 25° C., (Celvol E 4/88 LA), 534.0 g of a 15% aqueous solution of polyvinylalcohol, having a hydrolysis degree of 87-89% and a Hoppler viscosity at 4% concentration of 20 to 26 mPa·s at 25° C., (Celvol 523), 51.1 g of a 70% active alcohol ethoxylate nonionic surfactant, (Emulsogen EPN 287 from Clariant), 1.39 g of Brueggolite FF6 and 1.71 g of a defoamer, (Agitan 282), to 2621.7 g of deionised water whilst stirring. 1.7 g of a 4% active solution of ferric chloride was added, then the pH was adjusted to pH 4.2 by the use of phosphoric acid. Then the aqueous solution was charged to a 10-liter pressure reactor equipped with a stirrer, dosage pumps and a mass flow meter for dosing ethylene. The reactor was degassed by twice evacuating, then pressurizing with nitrogen to 2 bar, then finally evacuating. The stirrer was set to 600 rpm.

The reactor was heated to 36° C. 2002.4 g of vinyl acetate was pumped to the reactor. Then 667.5 g of ethylene was metered to the reactor.

When the reactor temperature and pressure stabilized at 36° C. the additions of a reducer solution comprising 9.29 g of Brueggolite FF6 and 2.62 g of sodium bicarbonate in 208.2 g of deionized water was commenced at a dosage rate of 44.0 g/hour and an oxidiser solution comprising 11.44 g of 70% active t-butylhydroperoxide dissolved in 202.5 g of deionised water was commenced at a dosage rate of 42.8 g/hour. After detection of a temperature increase of 2° C., the jacket temperature was increased so that the internal reactor temperature increased to 85° C. in 30 minutes. When the internal reactor temperature reached 80° C., the slow addition of a further 2002.4 g of vinyl acetate commenced over 155 minutes. When the reactor temperature reached 85° C., the slow addition of a further 667.5 g of ethylene commenced, maintaining the reactor pressure at 65 bar.

The jacket temperature was allowed to vary to keep the internal temperature at 85° C. After the addition of vinyl acetate was complete, the redox addition rates were maintained until the exotherm began to die. When the jacket temperature had increased to 70° C., the redox addition rates were doubled, and the internal temperature kept at 85° C. by allowing the jacket temperature to further increase.

After all additions were complete, the reaction mixture was cooled to 55° C. and transferred to a stripping vessel equipped with a stirrer, (operating at 200 rpm), and vacuum. When 50% had been transferred, a solution comprising 1.98 g of Brueggolite FF6 and 1.7 g of defoamer, (Agitan 282), in 126.8 g of deionised water was added. Once all of the reactor contents were transferred a solution comprising 1.22 g of 70% active t-butylhydroperoxide and 2.85 g of 30% active hydrogen peroxide in 138.8 g of deionised water was added, and the stripper was kept at 50° C. for 30 minutes. The stripper contents were cooled to 20° C. and discharged. The resultant dispersion was filtered through a 180μ mesh.

The resultant dispersion had a solids content of 55.4%, viscosity of 2340 mPa·s, pH of 5.6, grit, (measured on a 40μ mesh), of 0.005%, a Tg, (by DSC), of −14.7° C. onset/−6.8° C. mid-point, and a formaldehyde content by HPLC of 0.1 ppm.

Example 8

Preparation of a Vinyl Acetate/Ethylene Copolymer Dispersion

VA/E Weight Ratio=73.5/26.5
PVOH Stabilizer=Gohsenol KL05 (1.5 pphm)/Celvol E 4/88 LA (1.5 pphm)/Celvol 523 (1.5 pphm)
Nonionic Surfactant=Emulsogen EPN 287 (0.50 pphm)

The procedure of example 7 was followed except that the aqueous solution initially charged to the reactor was prepared by the addition of 400.8 g of a 20% aqueous solution of polyvinylalcohol, having a hydrolysis degree of 78.5-82% and a Hoppler viscosity at 4% concentration of 4.0 to 5.0 mPa·s at 25° C., (Gohsenol KL05), 320.6 g of a 25% aqueous solution of polyvinylalcohol, having a hydrolysis degree of 87-89% and a Hoppler viscosity at 4% concentration of 4.0 to 5.0 mPa·s at 25° C., (Celvol E 4/88 LA), 534.4 g of a 15% aqueous solution of polyvinylalcohol, having a hydrolysis degree of 87-89% and a Hoppler viscosity at 4% concentration of 20 to 26 mPa·s at 25° C., (Celvol 523), 38.2 g of a 70% active alcohol ethoxylate nonionic surfactant, (Emulsogen EPN 287 from Clariant), 1.39 g of Brueggolite FF6 and 1.71 g of a defoamer, (Agitan 282), to 2549.0 g of deionised water whilst stirring. 1.7 g of a 4% active solution of ferric chloride was added, then the pH was adjusted to pH 4.2 by the use of phosphoric acid.

Furthermore, 1963.9 g of vinyl acetate and 668.0 g of ethylene were initially charged to the reactor, and 1963.9 g of vinyl acetate and 748.1 g of ethylene were slow-added.

The resultant dispersion had a solids content of 55.4%, viscosity of 2980 mPa·s, pH of 5.6, grit, (measured on a 40μ mesh), of 0.006%, a Tg, (by DSC), of −16.6° C. onset/−8.7° C. mid-point, and a formaldehyde content by HPLC of 0.1 ppm.

Example 9

Preparation of a Vinyl Acetate/Ethylene Copolymer Dispersion

VA/E Weight Ratio=72/28
PVOH Stabilizer=Celvol E 4/88 LA (3.0 pphm)/Celvol 523 (1.5 pphm)
Nonionic Surfactant=Emulsogen EPN 287 (0.33 pphm)

The procedure of example 7 was followed except that the aqueous solution initially charged to the reactor was prepared by the addition of 642.5 g of a 25% aqueous solution of polyvinylalcohol, having a hydrolysis degree of 87-89% and a Hoppler viscosity at 4% concentration of 4.0 to 5.0 mPa·s at 25° C., (Celvol E 4/88 LA), 535.4 g of a 15% aqueous solution of polyvinylalcohol, having a hydrolysis degree of 87-89% and a Hoppler viscosity at 4% concentration of 20 to 26 mPa·s at 25° C., (Celvol 523), 25.2 g of a 70% active alcohol ethoxylate nonionic surfactant, (Emulsogen EPN 287 from Clariant), 1.39 g of Brueggolite FF6 and 1.71 g of a defoamer, (Agitan 282), to 2628.8 g of deionised water whilst stirring. 1.7 g of a 4% active solution of ferric chloride was added, then the pH was adjusted to pH 4.2 by the use of phosphoric acid.

Furthermore, 1927.4 g of vinyl acetate and 669.3 g of ethylene were initially charged to the reactor, and 1927.4 g of vinyl acetate and 829.9 g of ethylene were slow-added.

The resultant dispersion had a solids content of 55.0%, viscosity of 2525 mPa·s, pH of 5.4, grit, (measured on a 40μ mesh), of 0.008%, a Tg, (by DSC), of −18.8° C. onset/−10.0° C. mid-point, and a formaldehyde content by HPLC of 0.1 ppm.

Example 10

Preparation of a Vinyl Acetate/Ethylene Copolymer Dispersion

VA/E Weight Ratio=72/28
PVOH Stabilizer=Celvol E 4/88 LA (3.0 pphm)/Celvol 523 (1.5 pphm)
Nonionic Surfactant=Emulsogen EPN 287 (0.67 pphm)

The procedure of example 7 was followed except that 1922.3 g of vinyl acetate and 907.7 g of ethylene were initially charged to the reactor. 1922.3 g of vinyl acetate and 587.4 g of ethylene were slow-added, maintaining the reactor pressure at 75 bar.

The resultant dispersion had a solids content of 56.0%, viscosity of 3000 mPa·s, pH of 5.6, grit, (measured on a 40μ mesh), of 0.018%, a Tg, (by DSC), of −18.2° C. onset/−10.6° C. mid-point, and a formaldehyde content by HPLC that was non-detectable.

Example 11

Preparation of a Vinyl Acetate/Ethylene Copolymer Dispersion

VA/E Weight Ratio=72/28
PVOH Stabilizer=Gohsenol KL05 (3.0 pphm)/Celvol 523 (1.5 pphm)
Nonionic Surfactant=Emulsogen EPN 287 (0.67 pphm)

The procedure of example 7 was followed except that the aqueous solution initially charged to the reactor was prepared by the addition of 800.1 g of a 20% aqueous solution of polyvinylalcohol, having a hydrolysis degree of 78.5-82% and a Hoppler viscosity at 4% concentration of 4.0 to 5.0 mPa·s at 25° C., (Gohsenol KL05), 533.4 g of a 15% aqueous solution of polyvinylalcohol, having a hydrolysis degree of 87-89% and a Hoppler viscosity at 4% concentration of 20 to 26 mPa·s at 25° C., (Celvol 523), 51.1 g of a 70% active alcohol ethoxylate nonionic surfactant, (Emulsogen EPN 287 from Clariant), 1.39 g of Brueggolite FF6 and 1.71 g of a defoamer, (Agitan 282), to 2469.5 g of deionised water whilst stirring. 1.7 g of a 4% active solution of ferric chloride was added, then the pH was adjusted to pH 4.2 by the use of phosphoric acid.

Furthermore, 1920.1 g of vinyl acetate and 666.7 g of ethylene were initially charged to the reactor, and 1920.1 g of vinyl acetate and 826.7 g of ethylene were slow-added.

The resultant dispersion had a solids content of 55.6%, viscosity of 3170 mPa·s, pH of 5.5, grit, (measured on a 40μ mesh), of 0.004%, a Tg, (by DSC), of −19.2° C. onset/−10.5° C. mid-point, and a formaldehyde content by HPLC that was non-detectable.

Example 12

Preparation of a Vinyl Acetate/Ethylene Copolymer Dispersion

VA/E Weight Ratio=75/25
PVOH Stabilizer=Gohsenol KL05 (1.5 pphm)/Celvol 205 (1.5 pphm)/Celvol 523 (1.5 pphm)
Nonionic Surfactant=Emulsogen EPN 287 (1.0 pphm)

The procedure of example 7 was followed except that the aqueous solution initially charged to the reactor was prepared by the addition of 398.8 g of a 20% aqueous solution of polyvinylalcohol, having a hydrolysis degree of 78.5-82% and a Hoppler viscosity at 4% concentration of 4.0 to 5.0 mPa·s at 25° C., (Gohsenol KL05), 398.8 g of a 20% aqueous solution of polyvinylalcohol, having a hydrolysis degree of 87-89% and a Hoppler viscosity at 4% concentration of 4.6 to 5.4 mPa·s at 25° C., (Celvol 205), 531.7 g of a 15% aqueous solution of polyvinylalcohol, having a hydrolysis degree of 87-89% and a Hoppler viscosity at 4% concentration of 20 to 26 mPa·s at 25° C., (Celvol 523), 76.0 g of a 70% active alcohol ethoxylate nonionic surfactant, (Emulsogen EPN 287 from Clariant), 1.38 g of Brueggolite FF6 and 1.70 g of a defoamer, (Agitan 282), to 2564.2 g of deionised water whilst stirring. 1.7 g of a 4% active solution of ferric chloride was added, then the pH was adjusted to pH 4.2 by the use of phosphoric acid.

Furthermore, 1994.0 g of vinyl acetate and 664.7 g of ethylene were initially charged to the reactor, and 1994.0 g of vinyl acetate and 664.7 g of ethylene were slow-added.

The resultant dispersion had a solids content of 55.8%, viscosity of 2900 mPa·s, pH of 5.7, grit, (measured on a 40μ mesh), of 0.007%, a Tg, (by DSC), of −15.2° C. onset/−6.9° C. mid-point, and a formaldehyde content by HPLC of 0.1 ppm.

Example 13

Preparation of a Vinyl Acetate/Ethylene Copolymer Dispersion

VA/E Weight Ratio=68/32
PVOH Stabilizer=Celvol E 4/88 LA (3.0 pphm)/Celvol 523 (1.5 pphm)
Nonionic Surfactant=Emulsogen EPN 287 (0.67 pphm)

An aqueous solution was prepared by the addition of 612.6 g of a 25% aqueous solution of polyvinylalcohol, having a hydrolysis degree of 87-89% and a Hoppler viscosity at 4% concentration of 4.0 to 5.0 mPa·s at 25° C., (Celvol E 4/88 LA), 510.5 g of a 15% aqueous solution of polyvinylalcohol, having a hydrolysis degree of 87-89% and a Hoppler viscosity at 4% concentration of 20 to 26 mPa·s at 25° C., (Celvol 523), 48.9 g of a 70% active alcohol ethoxylate nonionic surfactant, (Emulsogen EPN 287 from Clariant), 1.33 g of Brueggolite FF6 and 1.63 g of a defoamer, (Agitan 282), to 2455.7 g of deionised water whilst stirring. 1.7 g of a 4% active solution of ferric chloride was added, then the pH was adjusted to pH 4.2 by the use of phosphoric acid. Then the aqueous solution was charged to a 10-liter pressure reactor equipped with a stirrer, dosage pumps and a mass flow meter for dosing ethylene. The reactor was degassed by twice evacuating, then pressurizing with nitrogen to 2 bar, then finally evacuating. The stirrer was set to 600 rpm.

The reactor was heated to 36° C. 1735.8 g of vinyl acetate was pumped to the reactor. Then 842.4 g of ethylene was metered to the reactor.

When the reactor temperature and pressure stabilized at 36° C. the additions of a reducer solution comprising 8.88 g of Brueggolite FF6 and 2.50 g of sodium bicarbonate in 199.1 g of deionized water was commenced at a dosage rate of 42.1 g/hour and an oxidiser solution comprising 10.94 g of 70% active t-butylhydroperoxide dissolved in 199.1 g of deionised water was commenced at a dosage rate of 40.9 g/hour. After detection of a temperature increase of 2° C., the jacket temperature was increased so that the internal reactor temperature increased to 85° C. in 30 minutes. When the internal reactor temperature reached 80° C., the slow addition of a further 1735.8 g of vinyl acetate commenced over 155 minutes. When the reactor temperature reached 85° C., the slow addition of a further 791.3 g of ethylene commenced, maintaining the reactor pressure at 80 bar.

The jacket temperature was allowed to vary to keep the internal temperature at 85° C. After the addition of vinyl acetate was complete, the redox addition rates were maintained until the exotherm began to die. When the jacket temperature had increased to 70° C., the redox addition rates were doubled, and the internal temperature kept at 85° C. by allowing the jacket temperature to further increase.

After all additions were complete, the reaction mixture was cooled to 55° C. and transferred to a stripping vessel equipped with a stirrer, (operating at 200 rpm), and vacuum. When 50% had been transferred, a solution comprising 1.89 g of Brueggolite FF6 and 1.6 g of defoamer, (Agitan 282), in 121.3 g of deionised water was added. Once all of the reactor contents were transferred a solution comprising 1.17 g of 70% active t-butylhydroperoxide and 2.72 g of 30% active hydrogen peroxide in 132.7 g of deionised water was added, and the stripper was kept at 50° C. for 30 minutes. The stripper contents were cooled to 20° C. and discharged. The resultant dispersion was filtered through a 180μ mesh.

The resultant dispersion had a solids content of 55.8%, viscosity of 2700 mPa·s, pH of 5.6, grit, (measured on a 40μ mesh), of 0.003%, a Tg, (by DSC), of −24.4° C. onset/−14.9° C. mid-point, and a formaldehyde content by HPLC of that was non-detectable.

Example 14

Study of Examples 1 to 10 at a Liquid:Powder Ratio of 1:0.7 and 1:1

The tensile strength and elongation was measured for examples 1 to 10 formulated as described in the description of test methods, at a liquid to powder ratio of 1:0.7 for the JS I formulation. A liquid to powder ratio of 1:0.7 for the JS I formulation corresponds to a ratio of filler, (cement+sand+calcium carbonate), to polymer of 1.50. The results are summarized in table 1 for the JS I formulation. Example 1 included the addition of DBP at a level of 4% in the liquid part, (replacing an equivalent amount of water).

TABLE 1

|  | Tensile Strength uncured, (MPa.) | % TS Retention after heat treatment | % TS Retention after alkali treatment | % TS Retention after water treatment | Elongation uncured, (%) | Elongation after heat treatment, (%) | Elongation after alkali treatment, (%) | Elongation after water treatment, (%) |
|---|---|---|---|---|---|---|---|---|
| Requirement | ≥1.2 | ≥80 | ≥60 | ≥60 | ≥200 | ≥150 | ≥150 | ≥150 |
| Example 1 | 2.54 | 178 | 134 | 146 | 186 | 112 | 174 | 141 |
| Example 2 | 2.87 | 111 | 104 | 105 | 130 | 88 | 94 | 78 |
| Example 3 | 3.72 | 106 | 101 | 104 | 216 | 223 | 182 | 204 |
| Example 4 | 3.78 | 104 | 101 | 101 | 243 | 229 | 206 | 222 |
| Example 5 | 3.81 | 104 | 103 | 102 | 232 | 237 | 202 | 210 |
| Example 6 | 2.99 | 109 | 111 | 114 | 200 | 195 | 180 | 172 |
| Example 7 | 2.16 | 113 | 123 | 122 | 293 | 240 | 250 | 201 |
| Example 8 | 2.19 | 105 | 110 | 112 | 354 | 382 | 298 | 300 |
| Example 9 | 2.45 | 105 | 106 | 107 | 297 | 321 | 268 | 269 |
| Example 10 | 2.01 | 105 | 120 | 121 | 434 | 454 | 362 | 399 |

The tensile strength and elongation was measured for examples 1 to 10 formulated as described in the description of test methods, at a liquid to powder ratio of 1:1 for the JS II formulation. A liquid to powder ratio of 1:1 for the JS II formulation corresponds to a ratio of filler, (cement+sand+ calcium carbonate), to polymer of 2.3. The results are summarized in table 2 for the JS II formulation. Example 1 included the addition of DBP at a level of 4% in the liquid part, (replacing an equivalent amount of water).

TABLE 2

|  | Tensile Strength uncured, (MPa.) | % Retention after heating | % Retention after alkali treatment | % Retention after water treatment | Elongation uncured, (%) | Elongation after heat treatment, (%) | Elongation after alkali treatment, (%) | Elongation after water treatment, (%) |
|---|---|---|---|---|---|---|---|---|
| Requirement | ≥1.8 | ≥80 | ≥70 | ≥70 | ≥80 | ≥65 | ≥65 | ≥65 |
| Example 1 | 2.75 | 179 | 163 | 169 | 90 | 58 | 58 | 54 |
| Example 2 | 2.56 | 105 | 116 | 118 | 71 | 66 | 49 | 42 |
| Example 3 | 3.51 | 104 | 115 | 116 | 120 | 123 | 100 | 97 |
| Example 4 | 2.99 | 131 | 146 | 149 | 136 | 116 | 106 | 87 |
| Example 5 | 3.25 | 126 | 135 | 135 | 137 | 124 | 100 | 100 |
| Example 6 | 3.28 | 105 | 109 | 110 | 139 | 131 | 102 | 102 |
| Example 7 | 2.04 | 133 | 166 | 155 | 255 | 158 | 153 | 114 |
| Example 8 | 2.10 | 122 | 146 | 151 | 204 | 160 | 148 | 122 |
| Example 9 | 2.44 | 116 | 135 | 136 | 150 | 148 | 115 | 120 |
| Example 10 | 2.15 | 105 | 137 | 141 | 253 | 257 | 211 | 205 |

It can be seen that Example 1, a commercially available dispersion sold for 2K Waterproofing, formulated with DBP plasticiser, did not achieve the elongation requirements for either JS I or JS II at these liquid to powder ratios. Example 2, with 25% ethylene, but only low molecular weight polyvinylalcohol, also did not achieve the elongation requirements of JS I or JS II. However, example 3, also with 25% ethylene, containing a mixture of low and medium molecular weight polyvinylalcohol, achieved the tensile strength and elongation requirements of JS I and JS II at these liquid: powder ratios. Comparing examples 7 to 10 with examples 3 to 6, demonstrates that inclusion of non-ionic surfactant decreases the tensile strength but increases the elongation. All of the examples 3 to 10 comfortably pass the requirements for tensile strength and elongation for both JS I and JS II.

Additionally, examples 1, 4 and 6 were tested for low temperature flexibility, as described in the description of test methods. Example 1 failed the test, but both examples 4 and 6 passed the test.

Example 15

Study of Examples 4 to 13 at a Higher Filler Levels

The tensile strength and elongation was measured for selected examples at higher filler levels than in Example 14. Liquid to powder ratio of 1:0.8, 1:0.9 or 1:1 for the JS I formulation were used. Liquid to powder ratio of 1:0.8, 1:0.9 and 1:1 for the JS I formulation correspond to a ratio of filler to polymer respectively of 1.7, 1.9 and 2.1. The results are summarized in Table 3 for the JS I formulation.

TABLE 3

|  | Liquid:Powder ratio | Tensile Strength uncured, (MPa.) | % Retention after heating | % Retention after alkali treatment | % Retention after water treatment | Elongation uncured, (%) | Elongation after heat treatment, (%) | Elongation after alkali treatment, (%) | Elongation after water treatment, (%) |
|---|---|---|---|---|---|---|---|---|---|
| Requirement |  | ≥1.2 | ≥80 | ≥60 | ≥60 | ≥200 | ≥150 | ≥150 | ≥150 |
| Example 7 | 1:0.8 | 2.41 | 110 | 125 | 127 | 293 | 334 | 273 | 266 |
| Example 8 | 1:0.9 | 2.34 | 112 | 125 | 125 | 251 | 254 | 222 | 199 |
| Example 9 | 1:0.8 | 2.65 | 105 | 116 | 118 | 232 | 242 | 221 | 200 |
| Example 10 | 1:1 | 2.28 | 104 | 129 | 128 | 213 | 222 | 205 | 192 |
| Example 11 | 1:1 | 2.10 | 108 | 131 | 135 | 202 | 211 | 164 | 174 |
| Example 12 | 1:1 | 2.18 | 135 | 149 | 151 | 236 | 270 | 175 | 168 |

The tensile strength and elongation was measured for selected examples at higher filler levels than in Example 14. Liquid to powder ratio of 1:1.2 for the JS II formulation were used. Liquid to powder ratio of 1:1.2 for the JS II formulation corresponds to a ratio of filler to polymer of 2.7. The results are summarized in Table 4 for the JS II formulation.

TABLE 4

|  | Tensile Strength uncured, (MPa.) | % Retention after heating | % Retention after alkali treatment | % Retention after water treatment | Elongation uncured, (%) | Elongation after heat treatment, (%) | Elongation after alkali treatment, (%) | Elongation after water treatment, (%) |
| --- | --- | --- | --- | --- | --- | --- | --- | --- |
| Requirement | ≥1.8 | ≥80 | ≥70 | ≥70 | ≥80 | ≥65 | ≥65 | ≥65 |
| Example 4 | 4.05 | 106 | 110 | 117 | 96 | 87 | 83 | 75 |
| Example 5 | 4.10 | 108 | 110 | 115 | 94 | 94 | 77 | 77 |
| Example 6 | 3.56 | 104 | 120 | 126 | 98 | 100 | 84 | 85 |
| Example 7 | 2.82 | 125 | 138 | 135 | 139 | 120 | 81 | 81 |
| Example 8 | 2.78 | 109 | 122 | 121 | 126 | 114 | 82 | 72 |
| Example 9 | 3.13 | 112 | 119 | 122 | 84 | 91 | 69 | 65 |
| Example 10 | 2.30 | 109 | 138 | 141 | 173 | 174 | 122 | 129 |
| Example 11 | 2.16 | 120 | 141 | 149 | 162 | 143 | 108 | 101 |
| Example 13 | 2.08 | 107 | 143 | 137 | 141 | 166 | 122 | 118 |

Example 15 shows that it is possible to achieve the tensile strength and elongation requirements at even higher filler levels for both JS I and JS II without the use of plasticizer. In some cases it is possible to achieve the tensile strength and elongation requirements for both JS I and JS II at significantly higher filler loadings, (in particular examples 10 and 11), while in other cases it is only possible to achieve the requirements at higher filler loadings for one formulation, (examples 12 and 13).

Example 16

Study of Bonding Strength

The bonding strength was measured for selected examples formulated at different liquid to powder ratios according to both JS I and JS II as described in the description of test methods. The results are summarized in Table 5.

TABLE 5

|  | Formulation | Liquid: Powder ratio | Bonding Strength uncured (MPa.) | Bonding Strength wet substrate (MPa.) | Bonding Strength after alkali treatment (MPa.) | Bonding Strength after water treatment (MPa.) |
| --- | --- | --- | --- | --- | --- | --- |
| Requirement |  |  | ≥0.7 | ≥0.7 | ≥0.7 | ≥0.7 |
| Example 4 | JS I | 1:0.7 | 1.61 | 1.28 | 1.19 | 1.17 |
| Example 4 | JS II | 1:1.2 | 1.58 | 1.51 | 1.16 | 1.33 |
| Example 6 | JS I | 1:0.7 | 1.36 | 1.43 | 1.05 | 1.52 |
| Example 6 | JS II | 1:1.2 | 1.43 | 1.53 | 1.09 | 1.30 |
| Example 11 | JS I | 1:1 | 1.20 | 1.56 | 1.04 | 1.06 |
| Example 11 | JS II | 1:1.2 | 1.11 | 1.18 | 1.09 | 1.02 |

Table 5 shows that examples fulfilling the requirements for tensile strength and elongation also fulfill the requirements for bonding strength.

While the present development has been described and illustrated by reference to particular embodiments, those of ordinary skill in the art will appreciate that the development lends itself to variations not necessarily illustrated herein.

The invention claimed is:

1. A coating composition comprising: an aqueous dispersion of a copolymer of a monomer mixture comprising at least one vinyl ester, ethylene, and a stabilizing system comprising at least one polyvinyl alcohol, wherein: (a) the monomer mixture comprises from 60 to 82 wt % of at least one vinyl ester and from 18 to 40 wt % of ethylene based on the total weight of monomers in the mixture; (b) the stabilizing system comprises at least one medium molecular weight polyvinyl alcohol having a Hoppler viscosity of from 20 to 36 mPa·s at 25° C. and at least one low molecular weight polyvinyl alcohol having a Hoppler viscosity of from 3.0 to 5.4 mPa·s at 25° C., wherein the medium molecular weight polyvinyl alcohol is present in an amount from 1 to 5 wt % based on the total weight of monomers in the mixture; (c) the dispersion has a polymeric solids content from 50% to 60% and a Brookfield viscosity range from 500 to 6,000 mPa·s at 25° C.; (d) the dispersion has a formaldehyde content of less than 10 ppm as determined by HPLC, and (e) the dispersion further comprises a filler composition comprising cement.

2. The coating composition according to claim 1, wherein the medium molecular weight polyvinyl alcohol has a degree of hydrolysis of 85 to 90 mole %.

3. The coating composition according to claim 1, wherein the stabilizing system comprises up to 5 wt. % of the low molecular weight polyvinyl alcohol based on the total weight of monomers in the mixture.

4. The coating composition according to claim 1, wherein the low molecular weight polyvinyl alcohol has a degree of hydrolysis of 85 to 90 mole %.

5. The coating composition according to claim 1, wherein the stabilizing system further comprises a second low molecular weight polyvinyl alcohol in an amount from 1 to 5 wt. % based on the total weight of monomers in the mixture.

6. The coating composition according to claim 5, wherein the second low molecular weight polyvinyl alcohol has a degree of hydrolysis of 75 to 85 mole %.

7. The coating composition according to claim 1, further comprising a nonionic surfactant in an amount of 0.1 to 2 wt. % based on total monomer weight.

8. The coating composition according to claim 7, wherein the nonionic surfactant is an alcohol ethoxylate of a $C_9$ to $C_{18}$ alcohol with 3 to 50 moles of ethylene oxide.

9. The coating composition according to claim 1, wherein the filler composition further comprises at least one hardening agent selected from the group consisting of calcium carbonate, magnesium carbonate, sand, silicates, and mixtures thereof.

10. The coating composition according to claim 1, wherein the filler composition comprises at least one additive selected from the group consisting of cellulose ether, super-plasticizer, defoamer, and mixtures thereof.

11. The coating composition according to claim 1, having a ratio of filler to polymer solids of greater than 1.5:1.

12. The coating composition according to claim 11 having an uncured tensile strength equal to or greater than 1.2 MPa.

13. The coating composition according to claim 11 having a tensile strength retention equal to or greater than 80% after heat treatment and a tensile strength retention equal to or greater than 60% after alkali or water treatment.

14. The coating composition according claim 11 having an uncured elongation equal to or greater than 200%, and an elongation equal to or greater than 150% after heat, alkali or water treatment.

15. The coating composition according to claim 1, having a ratio of filler to polymer solids of greater than 2.3:1.

16. The coating composition according to claim 15 having an uncured tensile strength equal to or greater than 1.8 MPa.

17. The coating composition according to claim 15 having a tensile strength retention equal to or greater than 80% after heat treatment and a tensile strength retention equal to or greater than 70% after alkali or water treatment.

18. The coating composition according to claim 15 having an uncured elongation equal to or greater than 80%, and an elongation equal to or greater than 65% after heat, alkali or water treatment.

19. The coating composition according to claim 1, wherein the ratio of filler to polymer solids is from 1:1 to 3:1.

20. The coating composition according to claim 1, further comprising a free radical redox polymerization initiator system comprising t-butyl hydroperoxide as an oxidizing agent and at least one of a sulfinic acid-based compound and erythorbic acid or a salt thereof as a reducing agent.

21. The coating composition according to claim 20, wherein the initiator system comprises erythorbic acid or a salt thereof as a reducing agent.

22. The coating composition according to claim 20, wherein the initiator system comprises a sulfinic acid-based compound as a reducing agent.

23. The coating composition according to claim 22, wherein the sulfinic acid-based reducing agent is a glycolic acid adduct of a sulfinic acid salt.

24. The coating composition according to claim 22, wherein the sulfinic acid-based reducing agent is a sulfinic acid-based compound selected from 2-hydroxyphenyl hydroxymethyl sulfinic acid-sodium salt; 4-methoxyphenyl hydroxymethyl sulfinic acid-sodium salt; 2-hydroxy-2-sulphonato acetic acid-disodium salt, 2-hydroxy-2-sulfinato acetic acid-disodium salt; 2-hydroxy-2-sulfinato acetic acid-zinc salt; 2-hydroxy-2-sulfinato propionate-disodium salt; ethyl 2-hydroxy-2-sulfinato propionate-sodium salt, sodium sulphite and combinations of said reducing agents.

25. The coating composition according to claim 20, wherein the polymerization initiator system further comprises a redox reaction catalyzing salt of a metal selected from iron, copper, manganese, silver, platinum, vanadium, nickel, chromium, palladium, and cobalt, with or without metal complexing agents.

26. The coating composition according to claim 1, wherein the vinyl ester comprises a vinyl ester of a $C_1$-$C_{13}$ saturated carboxylic acid.

27. The coating composition according to claim 1, wherein said composition does not comprise a plasticizer.

28. The coating composition according to claim 1, further comprises additives to form dispersion-based adhesives.

29. The coating composition of claim 26, wherein the vinyl ester is vinyl acetate.

* * * * *